United States Patent [19]

Naley et al.

[11] 3,973,618

[45] Aug. 10, 1976

[54] ELECTRONIC CAPACITY CONTROL OR DIRECT EXPANSION REFRIGERATION OF AIR CONDITIONING SYSTEMS

[75] Inventors: Lowell B. Naley, Minnetonka; Robert W. Haberkorn, Edina; Virgil D. Leinum, Minneapolis, all of Minn.

[73] Assignee: Westinghouse Electric Corporation, Pittsburgh, Pa.

[22] Filed: Dec. 24, 1974

[21] Appl. No.: 536,055

[52] U.S. Cl. .................................. 165/27; 62/223; 62/213; 236/75
[51] Int. Cl.² .................... F25B 29/00; F25D 17/06
[58] Field of Search ...................... 62/213, 229, 223; 236/75, 78 D, 1 E; 318/596; 165/27

[56] References Cited
UNITED STATES PATENTS

| | | | |
|---|---|---|---|
| 3,692,100 | 9/1972 | Gallagher, Jr. | 62/213 |
| 3,745,778 | 7/1973 | Attridge, Jr. | 62/229 |

Primary Examiner—William E. Wayner
Attorney, Agent, or Firm—C. F. Renz

[57] ABSTRACT

The invention relates to the air conditioning of a storage compartment and is especially significant for a transport system. Air is circulated between an air tempering zone and the storage compartment, said air tempering zone having air cooling means and air heating means controlled by a thermostat. The thermostat has a wide range set point and depending upon what set point is selected, the thermostat is responsive either to the temperature of the air discharged from the tempering zone or the temperature of the air returning to said zone. When the set point is above a given point and the air is being cooled to near the desired temperature, said desired temperature is accurately obtained by the thermostat first sending a signal from a selected one of the two sensors that provides a step-reduction in the capacity of the cooling means and then sending a signal to a modulating valve that further reduces to the set point the capacity of the cooling means by a modulation reduction.

4 Claims, 5 Drawing Figures

ELECTRONIC CAPACITY CONTROL OR DIRECT EXPANSION REFRIGERATION OF AIR CONDITIONING SYSTEMS

CROSS REFERENCES TO RELATED APPLICATIONS

So far as is known, this application is not related to any pending patent application.

BACKGROUND OF THE INVENTION

Fresh produce should be stored and transported at a temperature as close as possible to that at which the particular produce will not ripen too quickly, or have interior freezing, etc. Depending upon the produce to be stored, adjustments in the operation of an air conditioning system must be made to give the desired temperature for a particular product. To be as error proof as possible, the manual adjustment required to be made by a storage employee or a truck driver should be as simple as possible. When a load has been cooled to near a desired set point of above 20°F. and only a small amount of cooling is needed to obtain or maintain the desired temperature, it has been found that repeatedly cycling a compressor on and off is hard on the equipment and it does not provide a very close air temperature control.

It would therefore be desirable to design an air conditioning system that requires merely the adjustment of a set point to obtain and maintain an accurate desired temperature for storing a particular product. The temperature should be maintained as close as possible without repeated cycling of the compressor and regardless of extreme changes of temperature outside the storage compartment.

PRIOR ART

Reference is made to U.S. Pat. No. 2,219,472 Lithgow et al., 1935. This patent shows a thermostatic control for the temperature of the air in a railroad car, said thermostat having an adjustable set point. If the temperature of the car is below the set point, heaters are energized. If the temperature is above set point, two stages of cooling are used to obtain the desired temperature.

Reference is also made to U.S. Pat. No. 3,692,100, Gallagher, 1972, which shows a refrigeration system having two sensors with a particular sensor selected in accordance with the set point of the thermostat.

However, no patent discloses a system having a step-reduction in cooling capacity followed by a modulation of the reduced capacity in combination with a sensor switching thermostat.

SUMMARY OF THE INVENTION

An air conditioning system is disclosed in which the air in a compartment is changed to a desired temperature over a wide range of temperatures by merely moving the set point of a thermostat to a point for that desired temperature. A closely regulated temperature will be maintained, without further manual adjustments.

Air is continuously circulated between an air tempering zone and the compartment, the air tempering zone having an evaporator and electric heating means therein. The cooling and heating means are controlled by the thermostat and depending upon where the set point is placed the thermostat responds to one of two sensors. When the set point is set above a given point, the thermostat will be responsive to a sensor in the outlet of the tempering zone and the thermostat will activate the cooling or heating means to give the desired temperature. When the set point is moved to below the given point the thermostat will be responsive to a sensor in the entrance to the tempering zone and the thermostat will activate the cooling means to obtain the low temperature desired.

Assuming the set point has been set above the given point so that the outlet sensor is operative and the air has been cooled to 3°F. above the set point, the thermostat sends a signal that closes a portion of the suction line from the evaporator, thus giving a step-reduction in the cooling capacity. When the air temperature has thereafter been lowered to 1°F. above the assumed set point, the thermostat sends a signal to an analog or proportional modulating valve that modulates the flow through the remaining portion of the suction line.

The combination of the thermostat and a proportional modulating valve allows the system to control the respective air temperature at loads varying from full capacity of the unit down to virtually no load except that provided by the fan for circulating the air. Another major advantage is the flexibility of the temperature control setting of the system. The system will modulate at any temperature setting to match the load requirements. This is especially significant in a transport system where the set temperature may vary from −20° to +80°F. Also, when a suction modulating valve is utilized, the unit's power is minimized to only that required by the load.

DESCRIPTION OF THE PREFERRED EMBODIMENT

Figure 1:
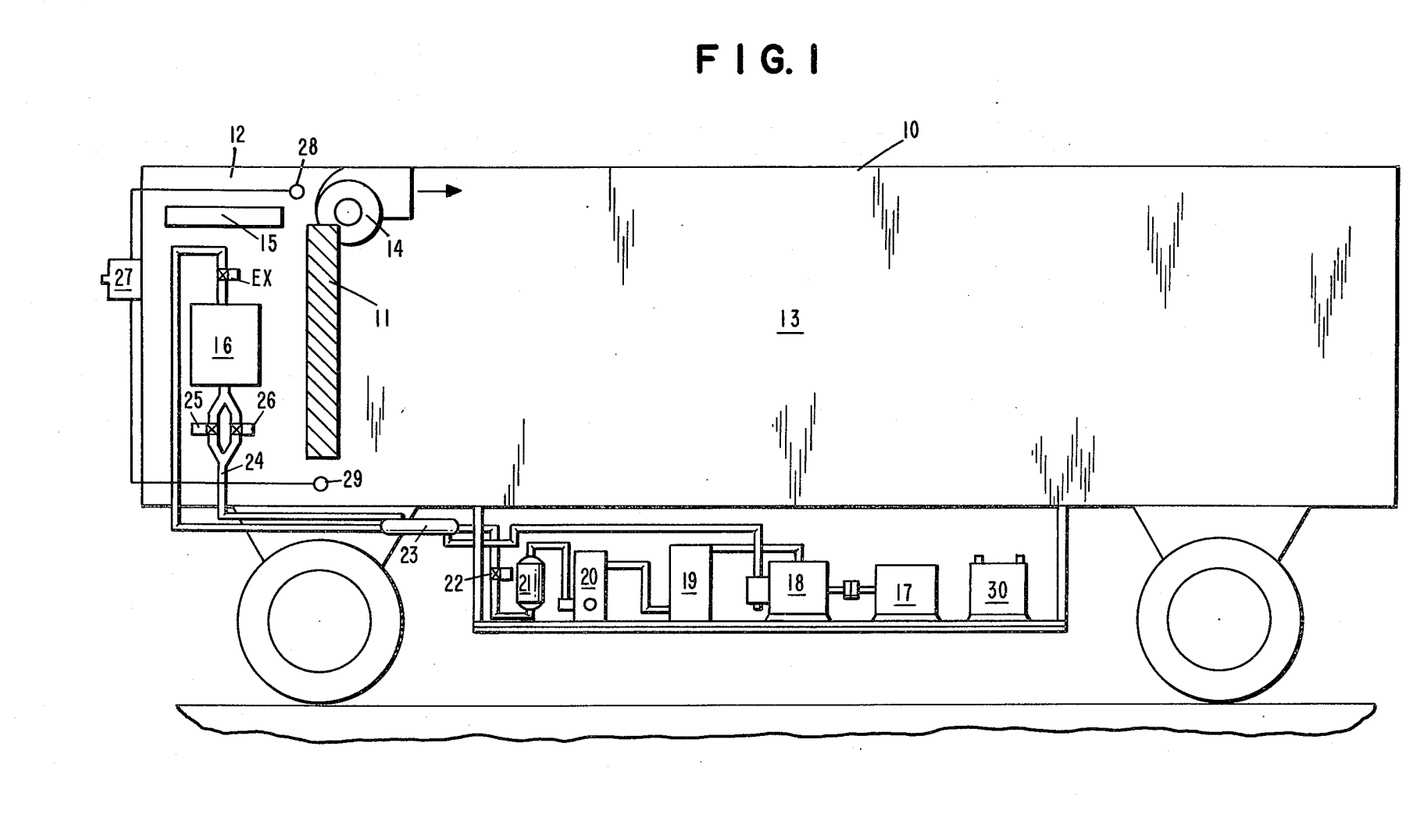
FIG. 1 is a sectional view taken longitudinally through a vehicle provided with air tempering apparatus adapted to be controlled in accordance with the teachings of the present invention.

To illustrate the invention, FIG. 1 of the drawings shows the interior of a vehicle 10 divided by a bulkhead 11 into an air tempering zone 12 and a storage compartment 13. A blower 14 continuously circulates air between the air tempering zone 12 and the compartment 13. In the air tempering zone 12 is an electric heater 15, and an evaporator 16 of a compression refrigeration system. A motor 17 drives a compressor 18 and compressed refrigerant is forced through condenser 19, a receiver 20, a drier 21, a solenoid operated liquid line valve 22, a heat exchanger 23 and through conventional expansion valve EX to the evaporator 16. Refrigerant vapor leaving the evaporator 16 passes through a suction line that is divided into two branches and reunited into a conduit 24 that extends to compressor 18. One branch of the suction line has a solenoid operated suction line valve 25 therein and the other branch has a power operated modulating valve 26 therein.

An adjustable wide range thermostat 27 is located in a position convenient to the operator of the vehicle. If the operator selects a set point for the thermostat that is above 20°F. the thermostat is responsive to a sensor 28 located in the path of the air discharging from the tempering zone 12. If a set point below 20°F. is selected the thermostat is responsive to a sensor 29 located in the path of the air entering the tempering zone 12.

A power source 30 furnishes power continuously to the blower 14 whenever a Master Switch is closed to turn on the air conditioning system. FIGS. 2 to 5 show the wiring for conducting power from power source 30 through the thermostat 27 to the several controls of the refrigeration system mentioned above and to the electric heater.

Figure 2:
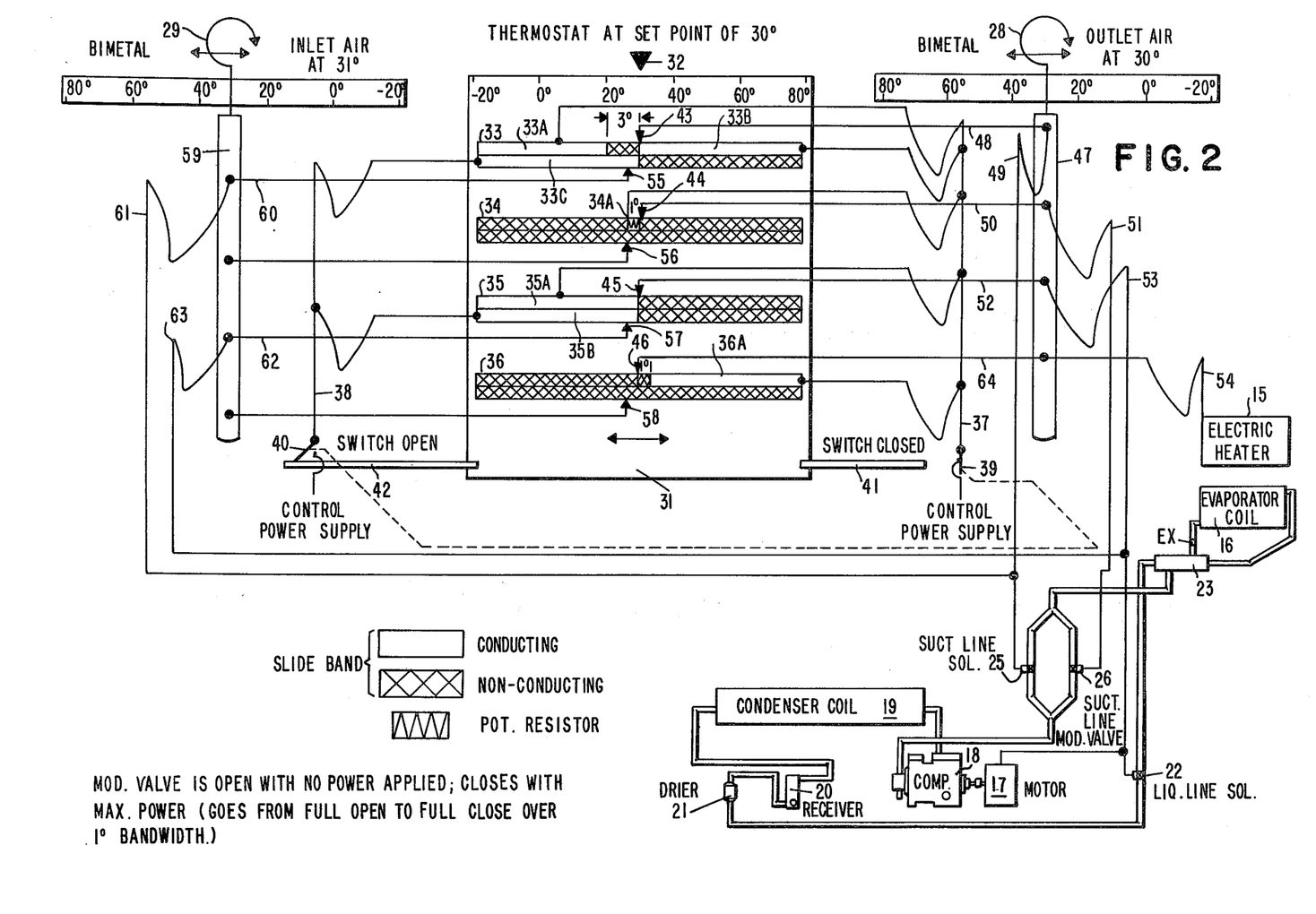
FIG. 2 shows the conditions of elements of the air tempering apparatus when its thermostat is at a set point of 30°F. with the outlet sensor 28 controlling and with air leaving the tempering apparatus assumed to be at 30°F. and the air entering the tempering apparatus assumed to be at 31°F.

Diagrammatically FIG. 2 relates to an electromechanical form of thermostat and shows a plate 31 that is moved to the right or left when the operator selects the desired set point for the thermostat. The top of the plate may be marked, for example, with a degree range from −20° to +80°. Above the movable plate is a fixed indicator 32 and the plate is moved to put the degree set point desired in vertical alignment with fixed indicator 32.

Mounted on movable plate 31 for movement therewith are slide bands or commutator bars 33, 34, 35 and 36. Slide band 33 has three conducting portions 33A, 33B, and 33C. Slide band 34 has one small conducting portion 34A in the form of an electric potential resistor. Slide band 35 has two conducting portions 35A and 35B. Slide band 36 has one conducting portion 36A.

The conducting portions on the top of the slide bands, that is 33A, 33B, 34A, 35A and 36A are connected to control power supply line 37 by wires that have sufficient slack to permit lateral movement of the plate 31. The conducting portions on the bottom of the slide bands, that is 33C and 35B, are connected to a power supply line 38 by wires that have sufficient slack to permit lateral movement of the plate 31.

Power supply line 37 has available power only when a switch 39 is closed, and power line 38 has available power only when a switch 40 is closed. Rigidly secured to plate 31 are rods 41 and 42 which will hold open either switch 39 or switch 40 depending upon the lateral position of plate 31. If plate 31 has been placed at a set point above 20°F., as in FIG. 2, switch 39 is closed in any suitable manner such as by gravity and switch 40 is held open by rod 42. If plate 31 has been placed at a set point below 20°F., as in FIG. 5, switch 39 is held open by rod 41 and switch 30 is closed in any suitable manner such as by a spring (not shown). Thus, the conducting portions at the top of the slide bands will have available power only when plate 31 is at a set point above 20°F. Conducting portions on the bottom of the slide bands will have available power only when plate 31 is at a set point below 20°F. The switches 39 and 40 may be ganged for simultaneous operation so that when one switch is closed the other is open and vice versa.

In a position to be moved across the tops of the slide bands are a set of brushes 43, 44, 45 and 46. These brushes are rigidly connected to a bar 47, said bar 47 being laterally movable under the control of an outlet air sensor bimetal 28 to thereby laterally move the set of brushes as the bimetal moves. Brush 43 is secured to bar 47 by a rigid conductor 48 and a flexible conductor 49 that extends to the solenoid of suction line valve 25. Conductor 49 has a flexible portion to allow for lateral movement of bar 47. Brush 44 is connected through a rigid conductor 50 and a flexible conductor 51 to power operated modulating valve 26. Brush 45 is connected through a rigid conductor 52 and a flexible conductor 53 to motor 17 and the solenoid of liquid line valve 22. Brush 46 is connected through a rigid conductor 64 and flexible conductor 54 to electric heater 15. For purposes of clarity and simplicity of the drawings, the return line conductors to the power supply have not been shown since it is believed they would be obvious to those skilled in the art.

In a position to move across the bottom of the slide bands are a set of brushes 55, 56, 57 and 58. These brushes are rigidly connected to be moved with bar 59 that is laterally movable under the control of inlet air sensor bimetal 29. Brush 55 is connected through rigid conductor 60 and flexible conductor 61 to the solenoid of suction line modulating valve 25. Brush 57 is connected through a rigid conductor 62 and flexible conductor 63 to motor 17 and the solenoid of liquid line valve 22. Brushes 56 and 58 are always in contact with a non-conducting part of their respective slide bands so connection to these brushes would play no part and are not shown.

FIG. 2 shows an operation where the set point is at 30°F. and the outlet air leaving the tempering zone is at the desired temperature of 30°F. If for any reason, such as cold weather, the outlet air leaving the tempering zone should start to drop below the desired temperature of 30°F., brushes 43, 44, 45 and 46 will start to move uniformly to the right. Electric heater 15 will not be energized immediately when brush 46 starts to move to the right because brush 46 will travel over 1° bandwidth of non-conducting surface before reaching conducting portion 36A. The reason for this design is that heat generated by the continuously operating fan 14 may take care of the 1° drop in temperature.

When brush 43 moves to the right due to a drop in air outlet temperature below that desired, said brush 43 contacts the conducting portion 33B and thus energizes the solenoid connected to open suction line valve 25. Suction line valve 25 should be open when electric heater 25 is about to be energized because the heater might heat evaporator coil 16 and there should be an escape for the vapor from any residual refrigerant that might be in evaporator coil 15.

FIG. 2 is drawn to show the probable temperature of the air entering the tempering zone as for example, 31°F. when the air leaving the tempering zone is 30°F. However, the temperature of the air entering the tempering zone is immaterial as far as this control is concerned, because if the set point is at 30°F. conducting portions 33C and 35B will not have power available.

Figure 3:
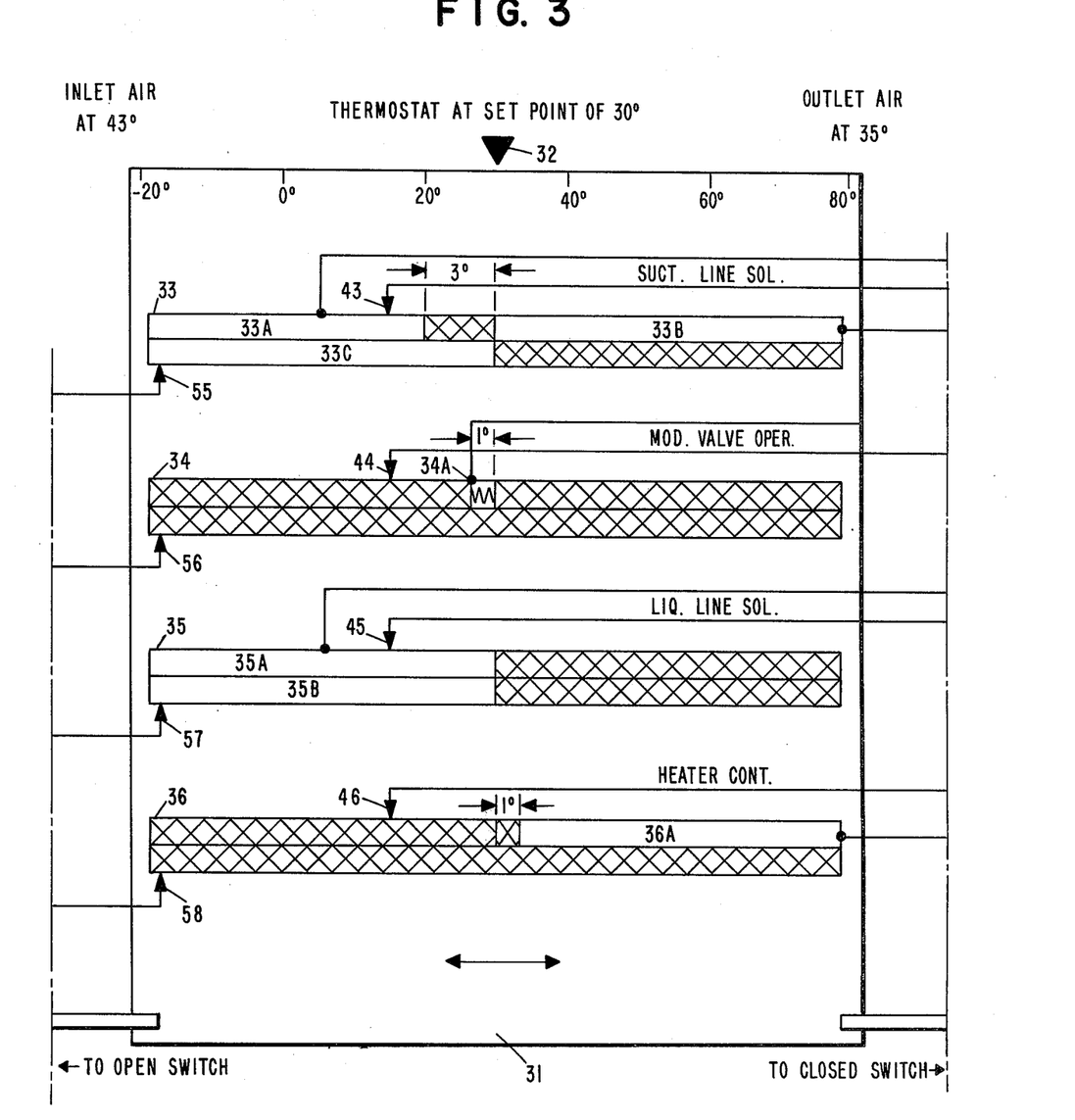
FIGS. 3 and 4 show the conditions of the elements of the thermostat which in each figure is at a set point of 30°F. as it is in FIG. 2, but in FIG. 3 the air leaving the tempering apparatus is assumed to be at 35°F. and the air entering the tempering apparatus is assumed to be at 43°F., while in FIG. 4 the air leaving the tempering zone is assumed at 30.5°F. and the air entering the tempering zone is assumed at 32.5°F.
Figure 4:
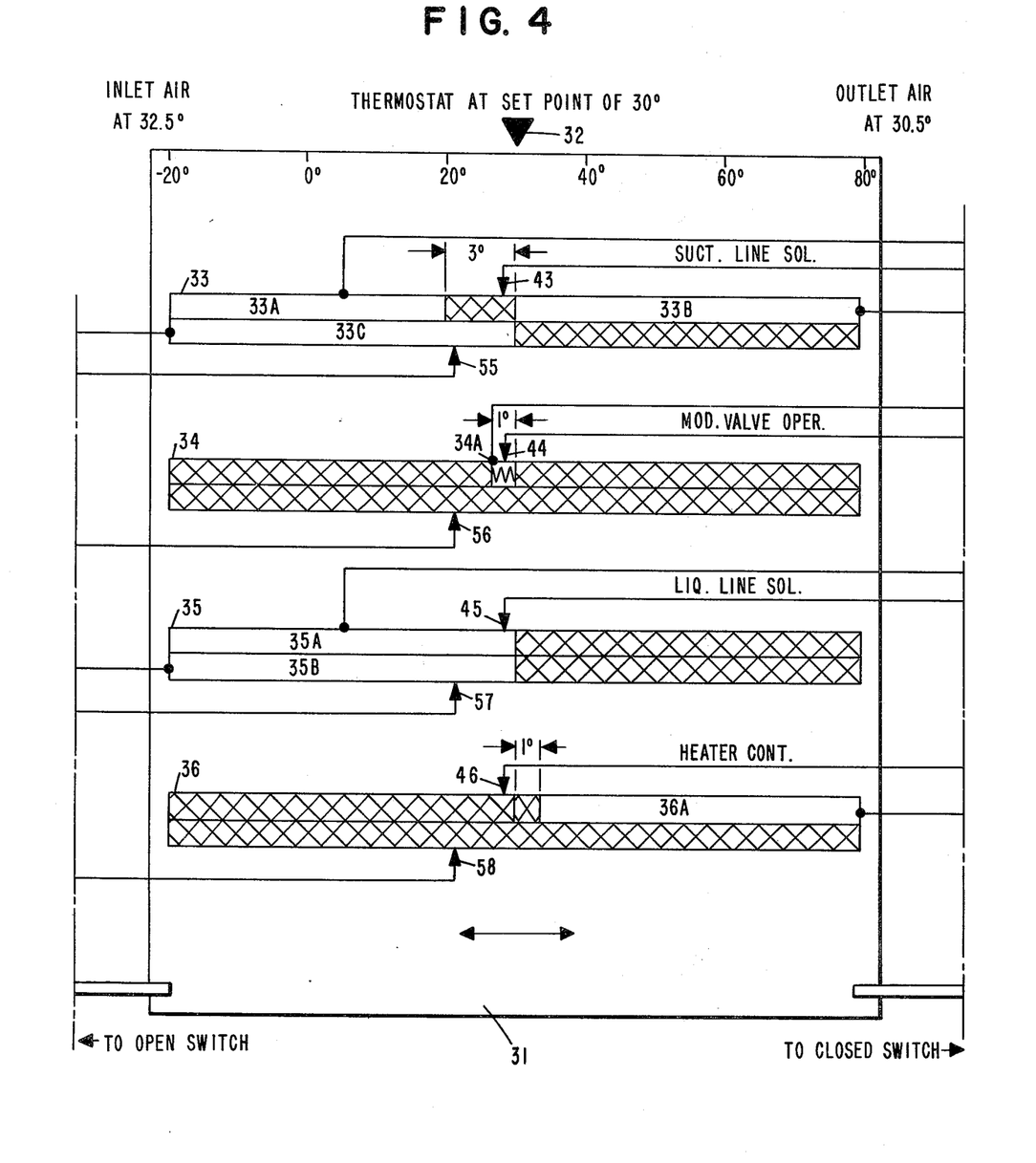

FIGS. 3 and 4 are two views of plate 31 on a scale double that shown in FIG. 2. As in FIG. 2, the plate 31 in FIGS. 3 and 4 is at a desired set temperature of 30°F.

FIG. 3 shows the positions of the brushes when the outlet air temperature is 35°F., that is 5° above the desired temperature. FIG. 4 shows the positions of the brushes when the outlet air temperature has been cooled down to 30.5°F., that is a half of degree from the desired temperature. On the upper part of slide band 33 is a non-conducting portion covering a slide band area of 3°. Slide band 34 has a portion in the form of an electric potential resistor covering 1° of the top of the slide band area. The size of these 3° and 1° portions on the slide bands are exaggerated and not on the same scale as the marked off degrees at the top of plate 31. If the 3° portion and 1° portion were on the same small scale at the marked off portion at the top of plate 31 they would not be clear in the illustrations given. In FIG. 3 brushes 43, 44, 45 and 46 should be placed at a distance to the left of the set point that would correspond to 5°. If these brushes were placed to the left of the set point a distance in proportion to the scale of degrees at the top of plate 31 the distance would be very small. Instead they have been placed to the left of the set point a distance corresponding to the enlarged scale used to show the 3° non-conducting portion on the top of slide band 33 and the 1° potential resistor portion 34A. In FIG. 3 the inlet air temperature is at 43°F. for example, and brushes 55, 56, 57 and 58 are spaced from the vertical set line a distance in proportion to the scale of the 3° non-conducting slide band portion and the 1° potential resistor portion 34A. However, in this figure where the set point is over 20°, the position of brushes 55, 56, 57 and 58 is immaterial as they will not contact any portion that has available power.

As the cooling continues brushes 43, 44, 45 and 46 will be moved to the right by sensor 28. When sensor 43 leaves conducting portion 33A and moves over the 3° non-conducting portion on the top of slide band 33, power will no longer be supplied to the solenoid of suction line valve 25 and this valve will close thus giving a step down reduction in the capacity of the refrigeration system. Thus, after the air has been cooled to 3° above set point, refrigerant vapor from evaporator coil 15 can pass only through modulating valve 15 which, thereafter, controls the reduction of capacity by its controllable restriction.

FIG. 4 shows the positions of the same elements as in FIG. 3 after the outlet air leaving the tempering zone has been cooled to 30.5°F. Brush 43 is still over the 3° non-conducting portion so suction line valve 25 remains closed. Brush 44 is moving over potential resistor portion 34A and a supply of power is increased from zero to move modulating line valve 26 from full open to full close position proportional to the potential supplied from resistor portion 34D. This gives a gradual reduction in the already reduced capacity of the refrigeration system. When the outlet air has been cooled down to the desired 30°F temperature, brushes 43, 44, 45 and 46 are in the positions shown in FIG. 2.

Figure 5:
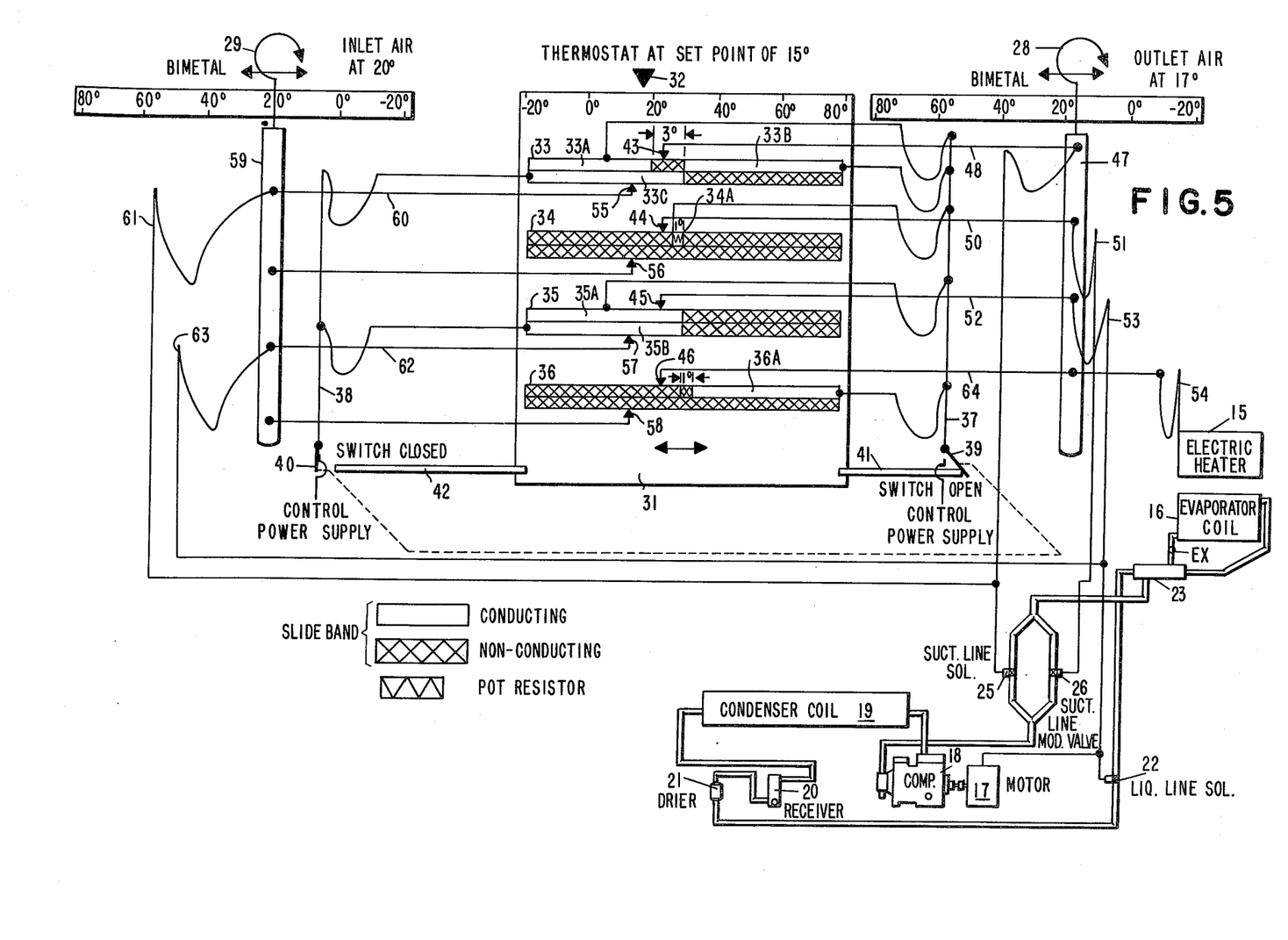
FIG. 5 shows the position of all of the elements shown in FIG. 2 when the thermostat is at a set point of 15°F. with the inlet air sensor 29 controlling and with air leaving the tempering zone assumed at 17°F. and the air entering the tempering zone assumed at 20°F.

In FIG. 5, plate 31 has been moved to the right of the drawing to a desired set point of 15°F. When the plate 31 is thus moved to a set point below 20°F switch 39 is opened by rod 41 and switch 40 is closed as described before. Power is now supplied to only conducting portions 33C and 35B. The operation of the system is solely under the control of sensor 29 located where air enters the air tempering zone 12. As the entering air temperature is shown at 20°F, brush 55 will be in contact with conducting portion 33C and brush 57 will be in contact with conducting portion 35B. Through conducting portion 35B, brush 57, conductors 62 and 63, motor 17 will be energized and the solenoid that opens liquid line valve 22 will be energized. Through conducting portion 33C, brush 55 and conductors 60 and 61, the solenoid that operates suction valve 25 will be energized. As the reduction of the temperature of the inlet air continues, sensor 29 will move brushes 55 and 57 to the right and when they move off the conduction portions current to motor 17, to the solenoid of liquid line valve 22, and to the solenoid of the suction line valve 25 will be discontinued so that the refrigerating portions of the system will be inoperable. It will be noted that no step-reduction or modulation of cooling capacity for the system is provided when the thermostat control is responsive to the inlet sensor 29 where the desired set point is 20°F. or lower.

On the following table is given a summary of the conditions of the control components for various functions in operation.

TABLE A

SUMMARY OF CONTROL COMPONENTS

| Unit Mode | Suction Line Solenoid-Step Reduction Valve 25 | Suction Line Modulating Valve 26 | Liquid Line Solenoid 22 | Compressor Contactor | Evaporator Fan Contactor | Heater Contactor | |
|---|---|---|---|---|---|---|---|
| 1. Set point above 20° on outlet air controlling | | | | | | | |
| a. Full cool | Open (On) | Open (Off) | Open (On) | On | On | Off | |
| b. Partial cool | Closed (Off) | Open (Off) | Open (On) | On | On | Off | Suction line solenoid 25 closes causing step reduction in capacity. |
| c. Modulated cool | Closed (Off) | Open to closed over 1° | Open (On) | On | On | Off | Modulating valve 26 goes from full open to full close reducing capacity further. |
| d. Null | Open (On) | Closed | Closed (Off) | Off | On | Off | Refrigeration off-evap. fan running continuously. |
| e. Heat | Open (On) | Closed | Closed (Off) | Off | On | On | Heaters and fan on. |
| 2. Set point below 20° inlet air controlling | | | | | | | |
| a. Full cool | Open (On) | Open (Off) | Open (On) | On | On | Off | |

TABLE A-continued

SUMMARY OF CONTROL COMPONENTS

| Unit Mode | Suction Line Solenoid-Step Reduction Valve 25 | Suction Line Modulating Valve 26 | Liquid Line Solenoid 22 | Compressor Contactor | Evaporator Fan Contactor | Heater Contactor | |
|---|---|---|---|---|---|---|---|
| b. Partial cool | Open | Open | Open | On | On | Off | Partial cool mode not functional below 20°. |
| c. Modulated cool | Open | Open | Open | On | On | Off | Modulated cool mode not functional below 20°. |
| d. Null | Open | Open | Closed (OFF) | Off | On | Off | Refrigeration off-evap. fan running. |
| e. Heat | Open | Open | Closed | Off | On | Off | Heat mode locked out below 20°. |

In FIGS. 2 to 5 the air outlet sensor 28 and the air inlet sensor 29 are shown as bimetallic members. It should be understood that these sensors could alternatively be bulbs containing a fluid or any other sensor that produces a moving force or a suitable control signal upon a change in temperature.

In the foregoing description, an electro-mechanical version of a thermostatic switch having a wide range set point capability has been illustrated in the drawings such that the scale of operation is greatly expanded. In a practical embodiment of the invention, an electronic thermostatic switch system, the details of which are not part of this invention, may be used having solid state logic circuits to provide the desired switching functions for selecting either the inlet or outlet solid state sensor element depending upon the desired set point and for providing the corresponding functions as previously described of modulation for the suction modulating valve and step reduction functions for the step reduction valve in the sunction line together with compressor and heating controls. Thus, an appropriate operation for the degree settings of the thermostat can be obtained on a reasonable degree scale which would be consistant with the exaggerated degree scale shown by FIGS. 2–5, in connection with the electro-mechanical form of thermostat as illustrated primarily for purposes of clarity of description.

What we claim as our invention is:

1. In an air conditioning system having an air tempering zone and a compartment to be conditioned, an adjustable capacity cooling means in the air tempering zone, means for circulating air between the air tempering zone and the compartment, means for selectively controlling either the temperature of the air discharging from the air tempering zone or the temperature of the air returning to the air tempering zone, said means including a two sensor thermostat having an adjustable set point, said thermostat having means to respond to a first sensor located at the discharge of the air tempering zone if the set point of the thermostat has been moved to above a given point and to respond to a second sensor located at the entrance to the air tempering zone if the set point has been moved to below said given point, said thermostat having means responsive to the first sensor to control the adjustable capacity cooling means including the provision of an analog signal to modulate the capacity of the cooling means when the discharge air has been cooled to a predetermined temperature close to the temperature at which the thermostat has been set above said given point, and said thermostat having means responsive to the second sensor to selectively activate said adjustable capacity cooling means without analog modular reduction in capacity during activation by the second sensor for cooling the air entering the treating zone to a temperature at which the thermostat has been set when the set point has been set below said given point.

2. In an air conditioning system as set forth in claim 1, said thermostat having means responsive to the first sensor for providing a step reduction in the cooling capacity of the cooling means when the discharge air is cooled to a predetermined temperature above but close to the discharge air temperature at which the thermostat modulates the capacity of the cooling means.

3. In an air conditioning system as set forth in claim 1, an electric heating means in said air tempering zone, and said thermostat having means, responsive to said first sensor, to actuate said electric heating means when the discharge air temperature is more than 1° Fahrenheit below the set point.

4. In an air conditioning system as set forth in claim 3, said means for circulating the air being a continuously operating fan that generates an amount of heat sufficient to raise the temperature of the discharge air 1° Fahrenheit.

* * * * *

UNITED STATES PATENT AND TRADEMARK OFFICE
CERTIFICATE OF CORRECTION

PATENT NO. : 3,973,618

DATED : August 10, 1976

INVENTOR(S) : Lowell B. Naley, Robert W. Haberkorn, Virgil D. Leinum

It is certified that error appears in the above-identified patent and that said Letters Patent is hereby corrected as shown below:

On the front data page, item 54, and at column 1, lines 3-4, the title should read:

> ELECTRONIC CAPACITY CONTROL OF
> DIRECT EXPANSION REFRIGERATION OR
> AIR CONDITIONING SYSTEMS

On the front data page, item [73] "Assignee" should read as follows:

> Thermo King Corporation
> Minneapolis, MN

Signed and Sealed this

Twentieth Day of May 1986

[SEAL]

Attest:

DONALD J. QUIGG

Attesting Officer

Commissioner of Patents and Trademarks